(12) United States Patent
Kim et al.

(10) Patent No.: US 8,181,045 B2
(45) Date of Patent: *May 15, 2012

(54) POWER CONTROL BUS

(75) Inventors: Neil Y. Kim, Laguna Niguel, CA (US);
Pieter Vorenkamp, Laguna Niguel, CA (US); Sumant Ranganathan, Sunnyvale, CA (US); Chun-ying Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 12/724,204

(22) Filed: Mar. 15, 2010

(65) Prior Publication Data

US 2010/0174927 A1    Jul. 8, 2010

Related U.S. Application Data

(63) Continuation of application No. 11/166,631, filed on Jun. 24, 2005, now Pat. No. 7,707,434.

(60) Provisional application No. 60/583,995, filed on Jun. 29, 2004.

(51) Int. Cl.
*G06F 1/00* (2006.01)
(52) U.S. Cl. .................................. 713/300; 713/320
(58) Field of Classification Search .................. 713/300, 713/320
See application file for complete search history.

(56) References Cited

U.S. PATENT DOCUMENTS

| | | | |
|---|---|---|---|
| 3,767,933 A | 10/1973 | Bogue et al. | |
| 4,310,606 A | 1/1982 | Maida | |
| 4,716,354 A | 12/1987 | Hacker | |
| 5,270,946 A | 12/1993 | Shibasaki et al. | |
| 5,444,664 A | 8/1995 | Kuroda et al. | |
| 5,477,123 A | 12/1995 | Allen et al. | |
| 5,483,656 A | 1/1996 | Oprescu et al. | |
| 5,519,261 A | 5/1996 | Stewart | |

(Continued)

FOREIGN PATENT DOCUMENTS

CN    1427319    7/2003

OTHER PUBLICATIONS

Anonymous, "Integrated Voltage Regulator for an On-Card +1.7 Volt Power Supply", IBM Technical Disclosure Bulletin, New York, USA, vol. 31 No. 2, Jul. 1, 1988, pp. 22-23.

(Continued)

*Primary Examiner* — Mark Connolly
(74) *Attorney, Agent, or Firm* — Brinks Hofer Gilson & Lione

(57) ABSTRACT

A circuit and method utilizing a power control data bus for implementing power control. Various aspects of the present invention provide an electrical circuit that comprises a power supply circuit that outputs electrical power. The electrical circuit may also comprise an integrated circuit that receives electrical power from the power supply circuit. The electrical circuit may also comprise a power control data bus, which communicatively couples a power control data bus interface of the power supply circuit and a power control data bus interface of the integrated circuit. The power control data bus may, for example, carry power control data between the integrated circuit and the power supply circuit. Various aspects of the present invention also provide a method that comprises communicating power control data over a power control data bus and utilizing the power control data to control characteristics of electrical power provided to an integrated circuit or module.

30 Claims, 4 Drawing Sheets

U.S. PATENT DOCUMENTS

| | | | |
|---|---|---|---|
| 5,621,301 | A | 4/1997 | Allen et al. |
| 5,637,980 | A | 6/1997 | Wu |
| 5,640,078 | A | 6/1997 | Kou et al. |
| 5,684,384 | A | 11/1997 | Barkat et al. |
| 5,867,377 | A | 2/1999 | Suranyi |
| 6,078,165 | A | 6/2000 | Ashtiani et al. |
| 6,081,096 | A | 6/2000 | Barkat et al. |
| 6,172,479 | B1 | 1/2001 | Barton |
| 6,268,711 | B1 | 7/2001 | Bearfield |
| 6,289,467 | B1 | 9/2001 | Lewis et al. |
| 6,356,057 | B1 | 3/2002 | Shilo et al. |
| 6,356,984 | B1 | 3/2002 | Day et al. |
| 6,396,169 | B1 | 5/2002 | Voegeli et al. |
| 6,459,175 | B1 | 10/2002 | Potega |
| 6,583,523 | B1 | 6/2003 | Bhate |
| 6,594,771 | B1 | 7/2003 | Koerber et al. |
| 6,651,178 | B1 | 11/2003 | Voegeli et al. |
| 6,668,328 | B1 | 12/2003 | Bell |
| 6,823,465 | B2 | 11/2004 | Zhang |
| 6,839,854 | B2 | 1/2005 | Nguyen |
| 6,856,556 | B1 | 2/2005 | Hajeck |
| 6,865,682 | B1 | 3/2005 | Talbot et al. |
| 6,914,349 | B2 | 7/2005 | Rajagopalan |
| 6,948,079 | B2 | 9/2005 | Zhang et al. |
| 7,000,125 | B2 | 2/2006 | Chapuis et al. |
| 7,009,363 | B2 | 3/2006 | Beals et al. |
| 7,085,943 | B2 | 8/2006 | Chun et al. |
| 7,176,654 | B2 | 2/2007 | Meyer et al. |
| 7,293,183 | B2 | 11/2007 | Lee et al. |
| 7,342,381 | B2 | 3/2008 | Johnson et al. |
| 7,509,507 | B2 | 3/2009 | Chen et al. |
| 7,581,122 | B2 | 8/2009 | Kim et al. |
| 7,707,434 | B2 * | 4/2010 | Kim et al. ............... 713/300 |
| 7,750,500 | B2 * | 7/2010 | Ranganathan et al. ......... 307/43 |
| 2004/0090219 | A1 | 5/2004 | Chapuis |
| 2004/0123164 | A1 | 6/2004 | Chapuis et al. |
| 2004/0153543 | A1 | 8/2004 | Thomas |
| 2004/0196678 | A1 | 10/2004 | Yoshimura et al. |
| 2004/0263118 | A1 | 12/2004 | Breen et al. |
| 2005/0188230 | A1 | 8/2005 | Bilak |
| 2005/0213267 | A1 | 9/2005 | Azrai et al. |
| 2005/0285575 | A1 | 12/2005 | Kim et al. |
| 2005/0285639 | A1 | 12/2005 | Chen et al. |
| 2005/0286191 | A1 | 12/2005 | Vorenkamp et al. |
| 2005/0286192 | A1 | 12/2005 | Ranganathan et al. |
| 2005/0289375 | A1 | 12/2005 | Ranganathan et al. |
| 2005/0289378 | A1 | 12/2005 | Vorenkamp et al. |
| 2006/0085660 | A1 | 4/2006 | Zagacki |
| 2006/0136757 | A1 | 6/2006 | Chen et al. |
| 2006/0284655 | A1 | 12/2006 | Li et al. |
| 2009/0177899 | A1 | 7/2009 | Chen et al. |

OTHER PUBLICATIONS

Merriam-Webster's Collegiate Dictionary, 2001, Merriam-Webster, Inc., Tenth Ed., p. 812.

European Search Report for EP Application No. 05013724.9, Oct. 13, 2005.

European Search Report for EP Application No. 05013691.0, Sep. 30, 2005.

* cited by examiner

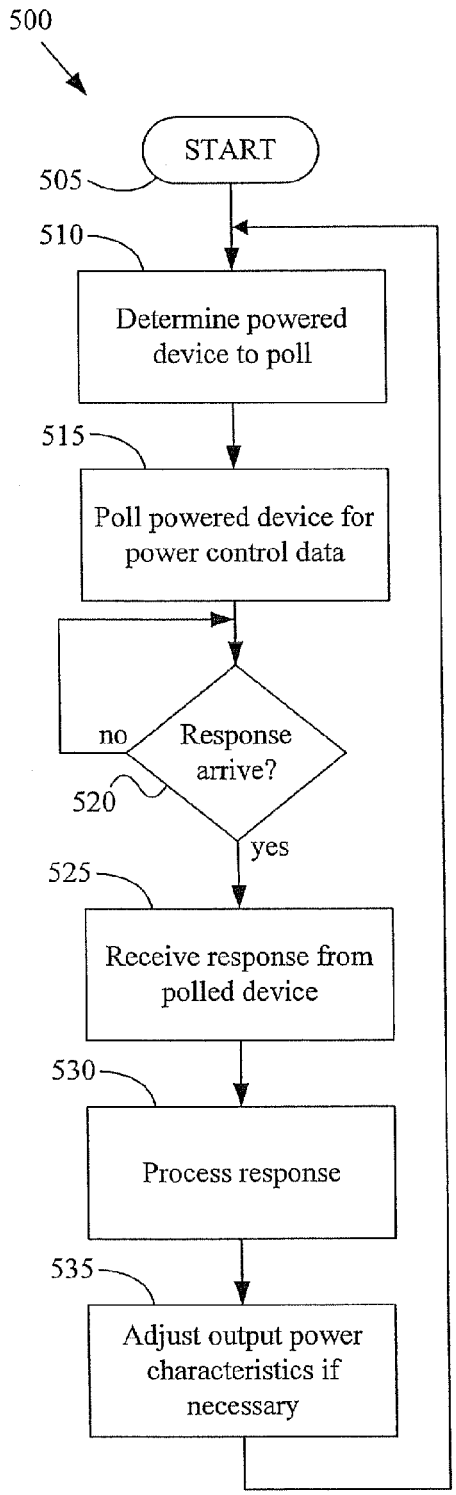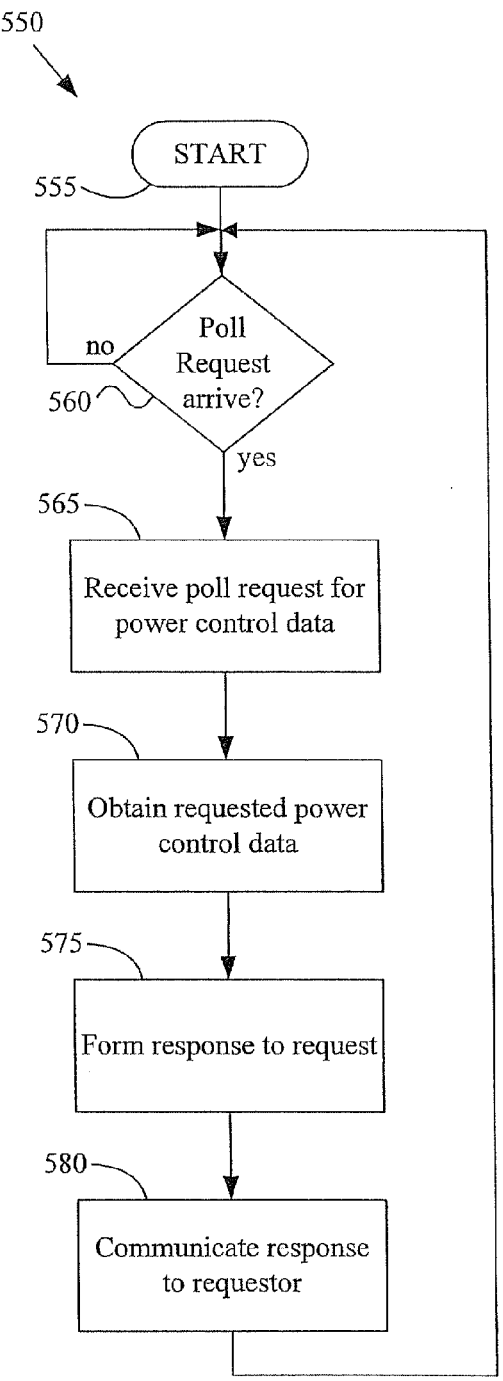
Figure 5a
Figure 5b

POWER CONTROL BUS

CROSS-REFERENCE TO RELATED APPLICATIONS/INCORPORATION BY REFERENCE

This patent application is a continuation of U.S. patent application Ser. No. 11/166,631, filed on Jun. 24, 2005; which makes reference to, claims priority to and claims benefit from provisional patent application Ser. No. 60/583,995, filed Jun. 29, 2004, and entitled "POWER CONTROL BUS". The contents of which each of the aforementioned patent applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Electrical circuits, or portions thereof, may utilize power over a wide range of values and/or qualities. Different circuit elements (e.g., integrated circuits or modules thereof) may have widely varying respective power supply needs. Such power supply needs may change over time and/or operating conditions. For example and without limitation, a module of an integrated circuit may be capable of operating at a first power level and/or quality during normal operation, operating at a heightened power level and/or quality during a high performance phase of operation, and operating at a lower power level and/or quality during a low performance phase of operation.

Further, energy utilization of an integrated circuit or module (or group thereof) may affect the level or other characteristics of power supplied to one or more other integrated circuits or modules. Accordingly, the characteristics of power being provided to an integrated circuit or module may change over time and/or operating conditions.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide an electrical circuit and method utilizing a power control data bus for implementing power control, substantially as shown in and/or described in connection with at least one of the figures, as set forth more completely in the claims. These and other advantages, aspects and novel features of the present invention, as well as details of illustrative aspects thereof, will be more fully understood from the following description and drawings.

BRIEF DESCRIPTION OF SEVERAL VIEWS OF THE DRAWINGS

FIG. 5a illustrates flow of an exemplary polling-based method for utilizing information communicated over a power control data bus to control power, in accordance with various aspects of the present invention.

FIG. 5b illustrates flow of an exemplary polling-based method for communicating power control information over a power control data bus, in accordance with various aspects of the present invention.

DETAILED DESCRIPTION OF THE INVENTION

Figure 1:
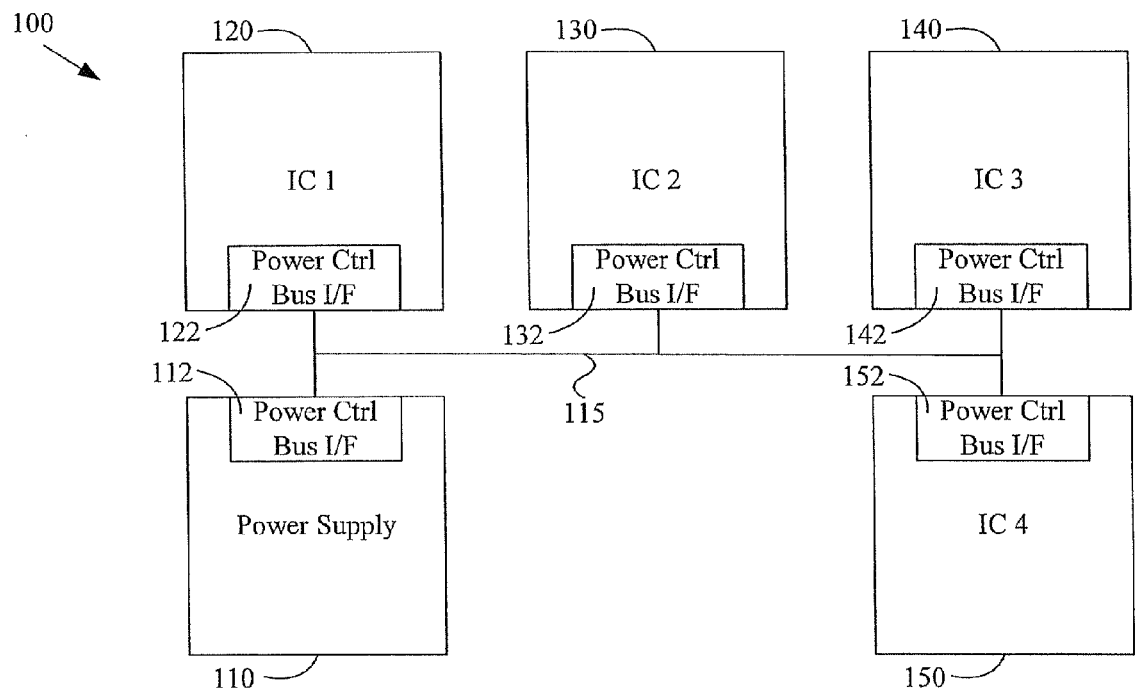
FIG. 1 shows a block diagram of an exemplary electrical circuit utilizing a power control data bus, in accordance with various aspects of the present invention.

FIG. 1 shows a block diagram of an exemplary electrical circuit 100 utilizing a power control data bus, in accordance with various aspects of the present invention. The exemplary circuit 100 may comprise characteristics of any of a large variety of electrical circuits and systems. For example and without limitation, the exemplary circuit 100 may comprise characteristics of a circuit board that includes a plurality of integrated circuit chips and power supply circuitry on a single integrated circuit board. Also for example, the exemplary circuit 100 may comprise characteristics of a distributed circuit (or system) that includes a power supply circuit and one or more integrated circuits on a circuit board that is distinct from the power supply circuit.

The exemplary circuit 100 may, for example and without limitation, comprise signal-processing circuitry. The exemplary circuit 100 may, for example, comprise computer circuitry, communication circuitry, control circuitry, user interface circuitry, etc. In general, the exemplary circuit 100 may comprise characteristics of any of a large variety of electrical circuits and systems. Accordingly, the scope of various aspects of the present invention should not be limited by electrical, functional, or physical characteristics of a particular type of electrical circuit or system.

The exemplary electrical circuit 100 may comprise a power supply circuit 110. The power supply circuit 110, which may also be referred to herein as a "power management unit," may comprise characteristics of any of a variety of power supply circuitry and/or power control circuitry. The power supply circuit 110 may generally output electrical power.

The power supply circuit 110 may, for example, comprise an adjustable power supply output. The power supply circuit 110 may, for example, be adapted to control one or more characteristics of electrical power output from the power supply circuit 110. For example and without limitation, the power supply circuit 110 may be adapted to control output voltage. Also for example, the power supply circuit 110 may be adapted to control output current, voltage variability characteristics (e.g., general tolerance limits, ripple, noise, statistical variance, any measure of fluctuation, etc.), load response characteristics, etc. Accordingly, the scope of various aspects of the present invention should not be limited by any particular characteristic of electrical power that may be controlled by the power supply circuit 110.

The power supply circuit 110 may comprise a power control data bus interface 112 that provides for communication between at least a portion of the power supply circuit 110 and a power control data bus 115, which will be discussed in more detail later. As mentioned previously, the power supply circuit 110 may output electrical power having various controllable characteristics. The power supply circuit 110 may, for example, control various controllable characteristics of its output power based, at least in part, on power control data that is communicated over the power control data bus 115, and which the power supply circuit 110 may receive through the power control data bus interface 112.

The exemplary electrical circuit 100 may comprise a first integrated circuit 120. The first integrated circuit 120 may comprise characteristics of any of a large variety of integrated circuits. For example and without limitation, the first integrated circuit 120 may comprise characteristics of a signal processing integrated circuit, a microprocessor integrated circuit, a memory integrated circuit, a user interface integrated circuit, a communication integrated circuit, etc. Accordingly, the scope of various aspects of the present invention should not be limited by characteristics of a particular type of integrated circuit.

The first integrated circuit 120 may receive electrical power from the power supply circuit 110. Various exemplary aspects and characteristics of such electrical power provided by the power supply circuit 110 were described previously.

The first integrated circuit 120 may comprise a power control data bus interface 122 that provides for communication between at least a portion of the first integrated circuit 120 and the power control data bus 115, which will be discussed in more detail later.

As mentioned previously, the power supply circuit 110 may output electrical power having various controllable characteristics, which may, for example, be based at least in part on power control data that is communicated over the power control data bus 115. The first integrated circuit 120 may, for example through the power control data bus interface 122 of the first integrated circuit 120, provide such power control data to the power supply circuit 110 over the power control data bus 115.

As discussed previously, the exemplary electrical circuit 100 may comprise a power control data bus 115. The power control data bus 115 may, for example, communicatively couple the power control data bus interface 112 of the power supply circuit 110 and the power control data bus interface 122 of the first integrated circuit 120. The power control data bus 115 may, for example, carry power control data between the first integrated circuit 120 and the power supply circuit 110.

The power control data bus 115 may comprise various characteristics of any of a variety of data bus types. For example and without limitation, the power control data bus 115 may utilize a power supply line for the communication of power control data. In an exemplary scenario, the power control data bus 115 may comprise data superimposed on the power signal of the power supply line. Such communication may, for example, be effected in a variety of manners. For example, a power control data signal may comprise an amplitude modulated data signal (e.g., a Manchester-encoded digital signal with zero DC average) superimposed on the power signal. Also for example, a power control data signal may comprise a constant-frequency signal combined with the power signal (e.g., at a frequency that would not be filtered out) and modulated according to QPSK or n-QAM modulation. Further for example, a power control data signal may comprise a frequency or code-modulated signal combined with the power signal. Thus, in the exemplary scenario, the power control data bus 115 may utilize one or more power supply lines, in any of a variety of manners, for the communication of power control data. Accordingly, the scope of various aspects of the present invention should not be limited by characteristics of any particular manner of utilizing a power supply line to communicate data.

The power control data bus 115 may alternatively, for example, utilize one or more data communication lines that are entirely, or at least substantially, dedicated to communicating power control data. In an exemplary configuration, the power control data bus 115 may comprise one or more conductors (or other transmission media) over which power control data may be communicated. In such an exemplary implementation, the power supply circuit 110 and the first integrated circuit 120 may comprise dedicated lines (or pins) for the communication of power control data over the power control data bus 115.

The power control data bus 115 may also, in particular exemplary configurations, utilize a portion of a general-purpose data bus for the communication of power control data. For example and without limitation, the power control data bus 115 may utilize a portion of a general-purpose data bus in a synchronous or asynchronous manner. For example, in an exemplary configuration, the power control data bus 115 may comprise one or more channels of a general data bus dedicated to the communication of power control data.

The power control data bus 115 may comprise any of a variety of additional data bus characteristics. For example, the power control data bus 115 may be characterized by serial bus or parallel bus characteristics. For example and without limitation, the power control data bus 115 may comprise characteristics of a single-bit bi-directional data bus. Also for example, the power control data bus 115 may comprise characteristics of a ring bus configuration. In an exemplary scenario, the power control data bus 115 may comprise characteristics of a star bus configuration.

Further for example, the power control data bus 115 may utilize any of a variety of communication media. The power control data bus 115 may, for example and without limitation, utilize wired communication media. The power control data bus 115 may also, for example, utilize wireless RF, tether optical, or non-tethered optical media.

Generally, the power control data bus 115 may comprise any of a variety of data bus characteristics. Accordingly, the scope of various aspects of the present invention should not be limited by characteristics of a particular type of data bus.

The power control data may generally comprise data that is used to control one or more characteristics of electrical power (e.g., as supplied by the power supply circuit 110 to the first integrated circuit 120). Such power control data may, for example, comprise a power supply command, power supply request, power characteristic measurement, or other power-related information.

The power control data may, for example and without limitation, comprise data indicative of, or otherwise related to, power supply voltage level. In an exemplary scenario, the power control data may comprise data related to an absolute voltage level, relative voltage level, voltage level comparison, voltage level change, etc.

The power control data may, for example, comprise data indicative of, or otherwise related to, power supply voltage variability. Such power supply voltage variability may, for example, comprise information related to voltage ripple, general voltage tolerance range, noise level, etc. The power control data may, for example, comprise data indicative of, or otherwise related to, current level. The power control data may, for example, comprise data indicative or, or otherwise related to, load response characteristics of the power supply. Accordingly, the scope of various aspects of the present invention should not be limited by particular power supply characteristics.

The power control data may also, for example, comprise characteristics of various communication-related data. Such data may, for example and without limitation, comprise data identifying the sender of transmitted information and/or the intended recipient(s) for transmitted information. For example, in an exemplary scenario where the first integrated circuit 120 transmits power control data to the power supply circuit 110, the power control data may comprise data identifying the first integrated circuit 120 as the sender of the power control data and/or data identifying the power supply circuit 110 as the intended recipient of the power control data. In another exemplary scenario involving a message communicated from the power supply circuit 110 to the first integrated circuit 120, the power control data may comprise data identifying the power supply circuit 110 as the sender of the power control data and the first integrated circuit 120 as the intended recipient of the message.

The power control data may also, for example, comprise various types of message identification data. For example and without limitation, the power control data may comprise packet identification data. Also for example, in an exemplary scenario where the power control data is responsive to a request for such data, the message identification data may comprise data indicative of the corresponding request.

In general, the power control data may comprise any of a variety of power-related data and/or message-related data. Accordingly, the scope of various aspects of the present invention should not be limited by characteristics of a particular type of power and/or message data.

As mentioned previously, the power supply circuit 110 and the first integrated circuit 120 may each comprise respective power control data bus interfaces 112, 122. The power control data bus interfaces 112, 122 may each provide for the communication of power control data over the power control data bus 115. The power control data bus interfaces 112, 122 may utilize any of a large variety of data communication protocols to communicate the power control data over the power control data bus 115.

For example and without limitation, the power control data bus interfaces 112, 122 may utilize a contention-free communication protocol to communicate power control data over the power control data bus 115. In a non-limiting exemplary scenario, the power control data bus interface 112 of the power supply circuit 110 may communicate a request message (e.g., a polling message) over the power control data bus 115 to the power control data bus interface 122 of the first integrated circuit 120. Such a request message may, for example, be addressed solely to the first integrated circuit 120. Such a request message may, for example, pass control of the power control data bus 115 to the first integrated circuit 120. Also for example, such a request message may be addressed to a plurality of integrated circuits that are communicatively coupled to the power control data bus 115 (e.g., utilizing multi-casting addressing or broadcasting).

Continuing the exemplary scenario, the power control data bus interface 122 of the first integrated circuit 120 may communicate a response message over the power control data bus 115 to the power control data bus interface 112 of the power supply circuit 110. The response message may comprise power control data requested by the power supply circuit 110 in the request message. The response message may also, for example, comprise information addressing (or otherwise identifying) the power supply circuit 110. The response message may also, for example, comprise information correlating the response message to the original request message. In a scenario where the original request message was addressed to a plurality of integrated circuits, the plurality of integrated circuits may each respond to the request message by respective response messages that include power control data.

The power control data bus interfaces 112, 122 may also utilize other contention-free communication protocols to communicate power control data over the power control data bus 115. For example and without limitation, each power control data bus interface 112, 122 may be allocated a unique communication channel (e.g., frequency, timeslot, code, etc.). Alternatively, for example, each power control data bus interface 112, 122 may wait to acquire a control token that authorizes the control data bus interface possessing the control token to utilize the power control data bus.

The power control data bus interfaces 112, 122 may also communicate power control data over the power control data bus 115 utilizing a contention-based communication protocol. For example and without limitation, the power control data bus interfaces 112, 122 may utilize CSMA, CSMA/CD or ALOHA protocols to communicate power control data over the power control data bus 115. In a non-limiting exemplary scenario, the power control data bus interface 122 of the first integrated circuit 120 may communicate unsolicited (i.e., not specifically requested by another entity) power control data to, the power control data bus interface 112 of the power supply circuit 110.

In general, communication of power control data over the power control data bus 115 may be governed by any of a variety of communication protocols. Accordingly, the scope of various aspects of the present invention should not be limited by characteristics of a particular communication protocol.

As mentioned previously, the power supply circuit 110 may communicate power control data over the power control data bus 115 with a plurality of integrated circuits. The exemplary electrical circuit 100 illustrated in FIG. 1 comprises second 130, third 140 and fourth 150 integrated circuits, each with respective power control data bus interfaces 132, 142, 152.

In an exemplary scenario, the power supply circuit 110 may receive power control data (e.g., solicited or unsolicited) from each of the integrated circuits 120-150 and process such power control data to determine at least one characteristic of electrical power being provided to the integrated circuits 120-150. Continuing the exemplary scenario, if the integrated circuits 120-150 share a common power supply bus, the power supply circuit 110 may arbitrate between power supply needs of the integrated circuits 120-150. Such arbitration may, for example, be based on a priority-based winner-take-all arbitration strategy, or may, for example, be based on a priority-based weighted averaging arbitration strategy. Also, for example, the power supply circuit 110 may perform general averaging of the power supply needs of the integrated circuits 120-150 as may be stated in the power control data.

Further for example, the power supply circuit 110 may arbitrate between power supply needs of the integrated circuits 120-150 and overall power needs or goals of a system that includes the integrated circuits 120-150. Such arbitration may additionally, for example and without limitation, comprise communicating with system components outside of the circuit 100 to establish such overall power needs or goals.

In general, the power supply circuit 110 may process power control data received from a plurality of sources to determine at least one characteristic of electrical power provided to the plurality of sources. Accordingly, the scope of various aspects of the present invention should not be limited by characteristics of a particular power control data processing strategy.

As shown in the exemplary electrical circuit 100 of FIG. 1, the power control data bus 115 may be shared between the power supply circuit 110 and a plurality of integrated circuits 120-150. As mentioned previously, the scope of various aspects of the present invention should not be limited by particular power control data bus architecture. For example and without limitation, FIG. 2 shows a block diagram of an exemplary circuit 200 utilizing a power control data bus, in accordance with various aspects of the present invention.

Figure 2:
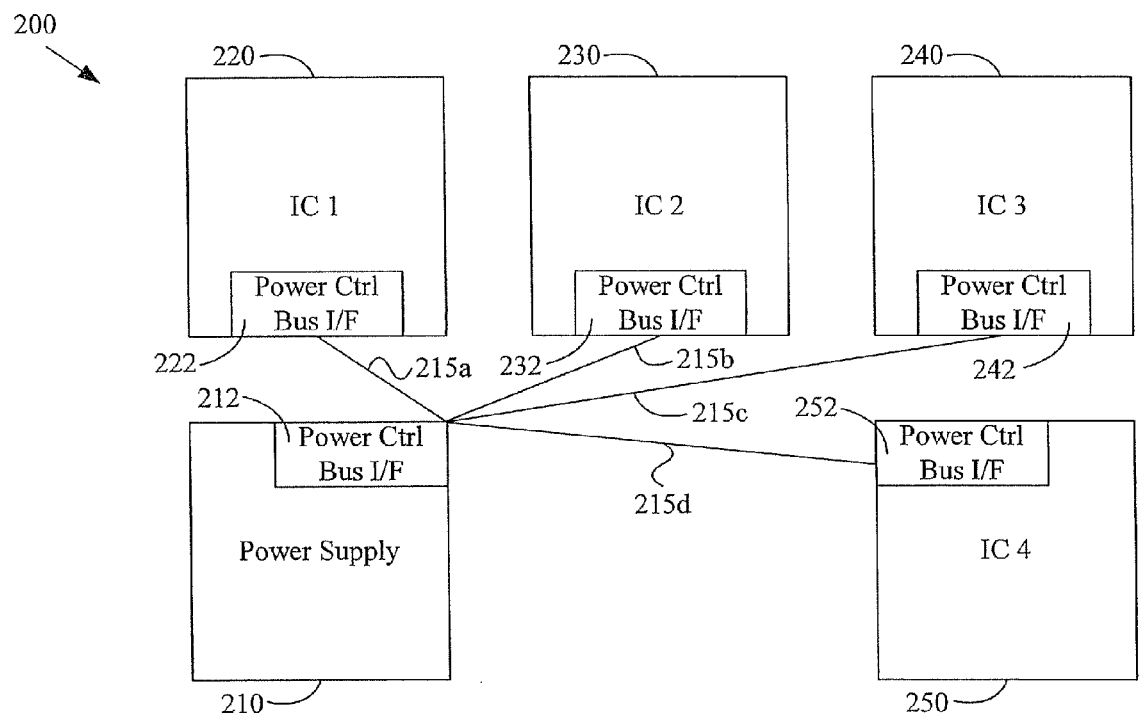
FIG. 2 shows a block diagram of an exemplary electrical circuit utilizing a power control data bus, in accordance with various aspects of the present invention.

The exemplary electrical circuit 200 illustrated in FIG. 2 comprises a power supply circuit 210 and respective power control data bus interface 212. The exemplary circuit 200 also comprises first 220, second 230, third 240 and fourth 250 integrated circuits, each with respective power control data bus interfaces 222, 232, 242, 252. The power supply circuit 210 and integrated circuits 220-250 may, for example and without limitation, share various characteristics with the power supply circuit 110 and integrated circuits 120-150 illustrated in FIG. 1 and discussed previously.

The exemplary electrical circuit 200 may comprise a power control data bus 215. The exemplary power control data bus 215 may, for example and without limitation, share various characteristics with the exemplary power control data bus 115 illustrated in FIG. 1 and discussed previously.

The exemplary power control data bus 215 is illustrated in a star configuration, with dedicated lines 215*a*-215*d* extending between the power control data bus interface 212 of the power supply circuit 210 and respective power control data bus interfaces 222, 232, 242, 252 of the integrated circuits 220, 230, 240, 250. The dedicated lines 215*a*-215*d* may, for example and without limitation, be isolated from each other. In an exemplary non-limiting scenario, the dedicated lines 215*a*-215*d* of the power control data bus 215 may be multiplexed at the power control data bus interface 212 of the power supply circuit 210.

Figure 3:
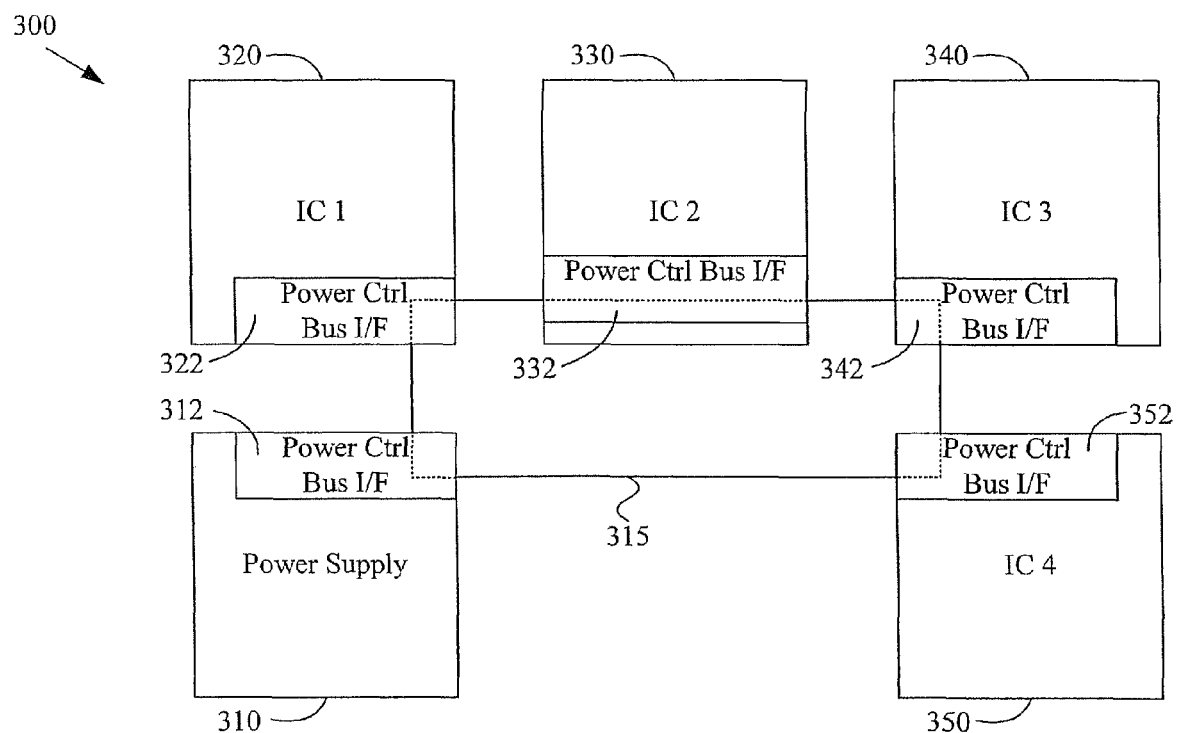
FIG. 3 shows a block diagram of an exemplary electrical circuit utilizing a power control data bus, in accordance with various aspects of the present invention.

For another non-limiting exemplary power control data bus configuration, refer to FIG. 3, which shows a block diagram of an exemplary electrical circuit 300 utilizing a power control data bus, in accordance with various aspects of the present invention.

The exemplary electrical circuit 300 illustrated in FIG. 3 comprises a power supply circuit 310 and respective power control data bus interface 312. The exemplary circuit 300 also comprises first 320, second 330, third 340 and fourth 350 integrated circuits, each with respective power control data bus interfaces 322, 332, 342, 352. The power supply circuit 310 and integrated circuits 320-350 may, for example and without limitation, share various characteristics with the power supply circuit 110 and integrated circuits 120-150 illustrated in FIG. 1 and discussed previously.

The exemplary electrical circuit 300 may comprise a power control data bus 315. The exemplary power control data bus 315 may, for example and without limitation, share various characteristics with the exemplary power control data bus 115 illustrated in FIG. 1 and discussed previously.

The exemplary power control data bus 315 is illustrated in a ring configuration, with the power control data bus 315 passing through the power control data bus interface 312 of the power supply circuit 310 and respective power control data bus interfaces 322, 332, 342, 352 of the integrated circuits 320, 330, 340, 350. Control of data communication over the exemplary power control data bus 315 may be governed by any of a variety of communication protocols, including, for example and without limitation, a token ring-style protocol. Communication over the exemplary power control data bus 315 may be governed by a contention-based or contention-free communication protocol.

Figure 4:
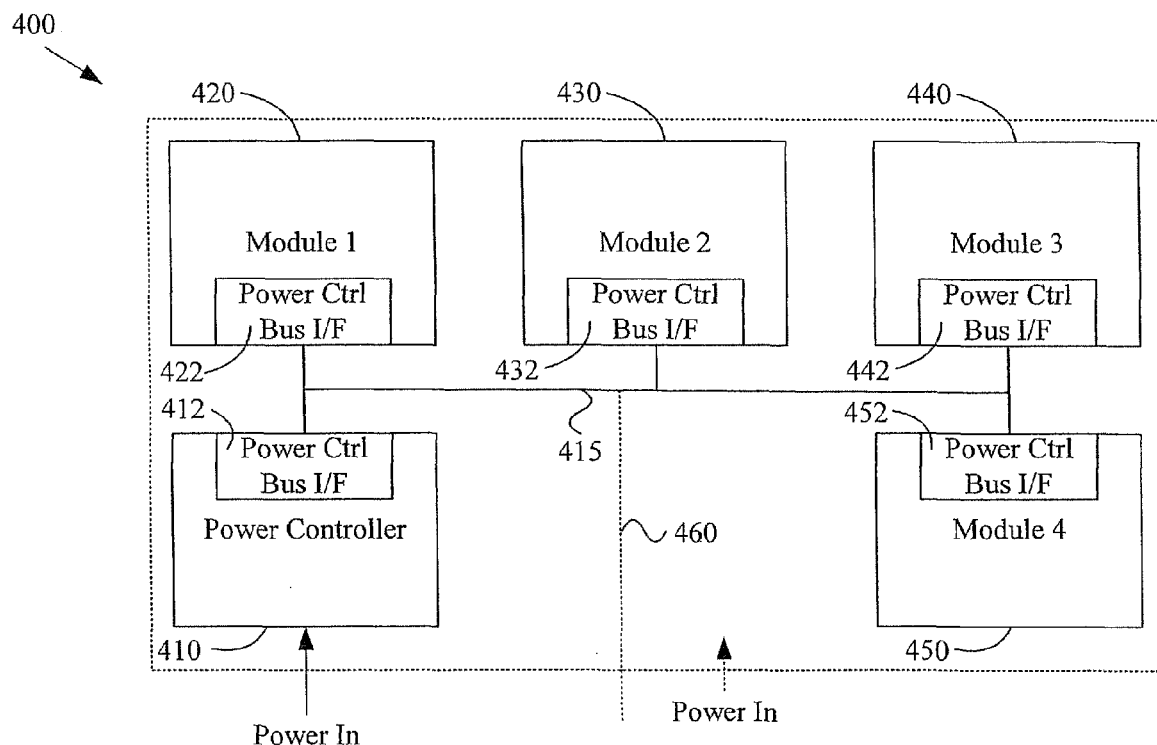
FIG. 4 shows a block diagram of an exemplary integrated circuit utilizing a power control data bus, in accordance with various aspects of the present invention.

The previous discussion generally focused on a power control data bus utilized to communicate power control data between a power supply circuit and various integrated circuits of an electrical circuit. It must be noted that various aspects of the present invention are readily applicable to a power control data bus internal to an integrated circuit that is utilized to communicate power control data. For example and without limitation, the previous discussions of inter-integrated circuit power control data, power control data bus architecture, power control data bus communication protocols, and power supply circuitry are readily extensible to an intra-integrated circuit scenario. FIG. 4 illustrates one such exemplary non-limiting scenario.

FIG. 4 shows a block diagram of an exemplary integrated circuit 400 utilizing a power control data bus, in accordance with various aspects of the present invention. The exemplary integrated circuit 400 may, for example and without limitation, share various characteristics of the exemplary circuit 100 and/or exemplary sub-circuits 110-150 illustrated in FIG. 1 and discussed previously.

For example and without limitation, the exemplary integrated circuit 400 may comprise signal-processing circuitry. The exemplary integrated circuit 400 may, for example, comprise computer circuitry, communication circuitry, control circuitry, user interface circuitry, etc. In general, the exemplary integrated circuit 400 may comprise characteristics of any of a large variety of electrical circuits and systems. Accordingly, the scope of various aspects of the present invention should not be limited by electrical, functional, or physical characteristics of a particular type of electrical circuit or system.

The exemplary integrated circuit 400 may comprise a power control module 410. The power control module 410 may comprise characteristics of any of a variety of power supply circuitry and/or power control circuitry. The power control module 410 may generally output electrical power.

The power control module 410 may, for example, comprise an adjustable power supply output. The power control module 410 may, for example, be adapted to control one or more characteristics of electrical power output from the power control module 410. In the exemplary integrated circuit 400 illustrated in FIG. 4, the power control module 410 receives electrical power from an external power source. The characteristics of such received power may vary greatly. For example and without limitation, the received electrical power may originate at an AC power source or a DC power source. The characteristics of such received electrical power may, for example, be relatively high quality or relatively low quality. Accordingly, the scope of various aspects of the present invention should not be limited by particular characteristics of electrical power received by the power control module 410.

The power control module 410 may, for example, be adapted to control output voltage. Also for example, the power control module 410 may be adapted to control output current, voltage variability characteristics (e.g., general tolerance limits, ripple, noise, etc.), load response characteristics, etc. Accordingly, the scope of various aspects of the present invention should not be limited by any particular characteristic of electrical power that may be controlled by the power control module 410.

The power control module 410 may comprise a power control data bus interface 412 that provides for communication between at least a portion of the power control module 410 and a power control data bus 415, which will be discussed in more detail later. The power control data bus 415, as illustrated in FIG. 4, may be completely internal to the integrated circuit 400. Alternatively, as illustrated by dashed line 460, the power control data bus 415 may extend beyond the integrated circuit 400 to communicate power control data with circuit entities (e.g., entities like the power supply circuitry 110 and/or power control data bus 115 of FIG. 1) external to the integrated circuit 400.

As mentioned previously, the power control module 410 may output electrical power having various controllable characteristics. The power control module 410 may, for example, control various controllable characteristics of its output power based, at least in part, on power control data that is communicated over the power control data bus 415, and which the power control module 410 may receive through the power control data bus interface 412.

The exemplary integrated circuit 400 may comprise a first functional module 420. The first functional module 420 may comprise characteristics of any of a large variety of integrated circuit modules. For example and without limitation, the first functional module 420 may comprise hardware and/or software characteristics of a signal processing module, a microprocessor module, a memory module, a user interface module, a communication module, etc. Accordingly, the scope of various aspects of the present invention should not be limited by characteristics of a particular type of integrated circuit module.

The first functional module 420 may receive electrical power from the power control module 410. Various exemplary aspects of such electrical power provided by the power control module 410 were described previously, for example in the discussion of the power supply circuit 110 of FIG. 1.

The first functional module 420 may comprise a power control data bus interface 422 that provides for communication between at least a portion of the first functional module 420 and the power control data bus 415, which will be discussed in more detail later.

As mentioned previously, the power control module 410 may output electrical power having various controllable characteristics, which may, for example, be based at least in part on power control data that is communicated over the power control data bus 415. The first functional module 420 may, for example through the power control data bus interface 422 of the first functional module 420, provide such power control data to the power control module 410 over the power control data bus 415.

As discussed previously, the exemplary integrated circuit 400 may comprise a power control data bus 415. The power control data bus 415 may, for example, communicatively couple the power control data bus interface 412 of the power control module 410 and the power control data bus interface 422 of the first functional module 420. The power control data bus 415 may, for example, carry power control data between the first functional module 420 and the power control module 410. The power control data bus 415 may comprise various characteristics of any of a variety of data bus types (e.g., as discussed previously with regard to the power control data bus 115 of FIG. 1. Accordingly, the scope of various aspects of the present invention should not be limited by characteristics of a particular type of data bus.

The power control data may, as discussed previously, generally comprise data that is used to control one or more characteristics of electrical power (e.g., as supplied by the power control module 410, or an external source, to the first functional module 420). In general, the power control data may comprise any of a variety of power-related data and/or message related data. Accordingly, the scope of various aspects of the present invention should not be limited by characteristics of a particular power and/or message data type.

Also, as discussed previously with regard to the exemplary electrical circuit 100 of FIG. 1, communication of power control data over the power control data bus 415 may be governed by any of a variety of data communication protocols, including contention-based or contention-free protocols. Accordingly, the scope of various aspects of the present invention should not be limited by characteristics of a particular communication protocol.

Similar to the exemplary electrical circuit 100 of FIG. 1 discussed previously, the power control module 410 may communicate power control data over the power control data bus 415 with a plurality of functional modules. The exemplary integrated circuit 400 illustrated in FIG. 4 comprises second 430, third 440 and fourth 450 functional modules, each with respective power control data bus interfaces 432, 442, 452.

In an exemplary scenario, the power control module 410 may receive power control data from each of the functional modules 420-450 and process such power control data to determine at least one characteristic of electrical power being provided to the functional modules 420-450. Continuing the exemplary scenario, if the functional modules 420-450 share a common power supply bus, the power control module 410 may arbitrate between power supply needs of the functional modules 420-450. Such arbitration may, for example, be based on a priority-based winner-take-all arbitration strategy, or may, for example, be based on a priority-based weighted averaging arbitration strategy. Also, for example, the power control module 410 may perform general averaging of the power supply needs of the functional modules 420-450 as may be stated in the power control data.

In general, the power control module 410 may process power control data received from a plurality of sources to determine at least one characteristic of electrical power provided to the plurality of sources. Accordingly, the scope of various aspects of the present invention should not be limited by characteristics of a particular power control data processing strategy.

As shown in the exemplary integrated circuit 400 of FIG. 4, the power control data bus 415 is shared between the power control module 410 and a plurality of functional modules 420-450. As mentioned previously, the scope of various aspects of the present invention should not be limited by particular power control data bus architecture. For example and without limitation, the power control data bus 415 may alternatively be characterized by a tree, star or ring configuration.

It should be noted that the previous discussion of the exemplary integrated circuit 400 illustrated in FIG. 4 included a discussion of functional modules. A functional module may comprise any of a variety of functional module characteristics. For example, a functional module may comprise various amounts of hardware and/or software. A first functional module may share portions of hardware and/or software with a second functional module. Accordingly, the scope of various aspects of the present invention should not be limited by arbitrary boundaries between functional modules.

With regard to the exemplary systems and integrated circuits illustrated in FIGS. 1-4, note that various systems, circuits and integrated circuits may be combined with other circuitry. For example, the circuit 100 illustrated in FIG. 1 may be combined with another circuit, which might also have a respective power control bus. In such an exemplary scenario, the power control bus 115 may be coupled to the respective power control bus of the other circuit. Each circuit may, for example, comprise power control circuitry, and various power control circuitry of the circuit 100 and the other circuit(s) may communicate over the power control bus 115 (e.g., to negotiate, communicate power needs and goals, request power having particular characteristics, etc.). For example, a plurality of power controllers may communicate with each other and with various other circuitry over the same power control bus 115. As a non-limiting example, power control circuitry may be adapted to poll other devices on the power control bus or transmit beacon signals. Such signaling may, for example, provide for power control circuitry (and various other circuitry) to determine various other devices coupled to the power control bus 115.

FIG. 5a illustrates flow of an exemplary polling-based method 500 for utilizing information communicated over a power control data bus to control power, in accordance with various aspects of the present invention. FIG. 5b illustrates flow of an exemplary polling-based method 550 for communicating power control information over a power control data bus, in accordance with various aspects of the present invention.

The exemplary method 500 illustrated FIG. 5a may, for example, be implemented in a power-supplying (or power controlling) circuit, and the exemplary method 550 illustrated in FIG. 5b may, for example, be implemented in a power-receiving integrated circuit. Accordingly, the exemplary methods 500, 550 will be presented in a manner illustrative of the processing and interaction between an exemplary power-supplying circuit and an exemplary power-receiving integrated circuit implementing the respective methods 500, 550. However, the scope of various aspects of the present invention should by no means be limited to requiring aspects of both exemplary methods 500, 550.

The exemplary method 500 may, for example and without limitation, share various characteristics with the functionality discussed previously with regard to the exemplary power supply circuits 110, 210, 310 or power control module 410 illustrated in FIGS. 1-4. The exemplary method 550 may; for example and without limitation, share various characteristics with the functionality discussed previously with regard to the exemplary integrated circuits 120-150, 220-250, 320-250 or functional modules 420-450 illustrated in FIGS. 1-4.

The exemplary method 500 may begin executing at step 505. The exemplary method 500, and other exemplary methods discussed herein, may begin executing for any of a variety of reasons. For example and without limitation the method 500 may begin executing when a device implementing the method 500 is powered up or reset. Also for example, the method 500 may begin executing in response to a command to begin executing. Further for example, the method 500 may begin executing in response to a timer expiring. Additionally, for example, the method 500 may begin in response to a detected real-time operating condition. In general, the exemplary method 500, and other exemplary methods discussed herein, may begin executing for any of a variety of reasons. Accordingly, the scope of various aspects of the present invention should not be limited by characteristics of any particular initiating causes or conditions.

The exemplary method 500 may, at step 510, comprise determining a powered device (e.g., a powered integrated circuit) to transmit a request (or poll) message to, where the request message comprises a request for power control data. Such a request message may, for example and without limitation, comprise a request for a particular type of power control data, a particular set of power control data, or for all known power control data. Step 510 may, for example, comprise determining a single powered device to transmit a request message to or may comprise determining a plurality of powered devices to transmit a request message to. Step 510 may alternatively, in an exemplary scenario where such request messages are broadcast to all devices, skip making any determination of destination for the request message.

The exemplary method 500 may, at step 515, comprise communicating the request (or poll) message to the determined powered device(s). Step 515 may, for example, comprise transmitting the request message to the determined powered device(s) over a power control data bus. Such a power control data bus may, for example and without limitation, share characteristics with the exemplary power control data buses 115, 215, 315, 415 illustrated in FIGS. 1-4 and discussed previously.

Such a request (or polling) message may, for example and without limitation, share various characteristics with the request message discussed previously with regard to the exemplary electrical circuit 100 illustrated in FIG. 1. For example and without limitation, the request message may comprise information identifying (e.g., addressing) a source and/or destination for the request message. Also for example, in an exemplary scenario where step 515 comprises multi-casting or broadcasting the request message to a plurality of recipients, the request message may comprise information identifying a plurality of destination devices (e.g., integrated circuits, integrated circuit modules, or other circuits).

After communicating the request message (e.g., at step 515), the method 500 may, at step 520, comprise waiting for a response to the request message. Step 520 may, in various exemplary scenarios, comprise waiting for a single response to a single request message, waiting for a plurality of responses corresponding to a single request message, or waiting for a plurality of responses corresponding to a plurality of request messages.

The exemplary method 550 may, at step 560, comprise waiting (e.g., at a powered device) for a message requesting power control data to arrive. Upon arrival of a request (or polling) message, the method 550 may, at step 565, comprise receiving the request message.

After arrival of a request message, the exemplary method 550 may, at step 570, comprise obtaining the requested power control data. Step 570 may, for example and without limitation, comprise determining which data the request message is requesting and retrieving the requested data (e.g., from a memory device or a sensor).

The exemplary method 550 may then, at step 575, comprise forming a response message corresponding to the request message received at step 565. The response message may, for example, comprise power control data, as discussed previously. Also for example, the response message may comprise information identifying (e.g., addressing) the source and/or destination for the response message. Further for example, the response message may comprise information identifying a corresponding received request message (e.g., the message received at step 565). In general, the response message may comprise any of a large variety of data message characteristics, as described previously.

After forming the response message at step 575, the exemplary method 550 may, at step 580, comprise communicating the response message (e.g., including the requested power control data and/or other data discussed previously) to the requestor (e.g., power supply or control circuitry that is implementing the exemplary method 500) over a power control data bus. The power control data bus may, for example and without limitation, be the same power control data bus over which the exemplary request was received at step 565. In a non-limiting exemplary scenario, step 580 may comprise transmitting a message, including power control data, from a powered integrated circuit to a power supply circuit over a power control data bus.

Following step 580, execution of the exemplary method 550 may flow back up to step 560, for waiting for another request for power control data. In an alternative exemplary scenario involving communicating a plurality of response messages, execution of the method 550 may flow back up to step 570 for obtaining and communicating additional power control data. Execution of the exemplary method 550 may traverse many alternative flow paths. Accordingly, the scope of various aspects of the present invention should not be limited by the exemplary flow illustrated in FIG. 5*b*.

As mentioned previously, the exemplary method 500 may, at step 520, comprise waiting for a response message to arrive at the device implementing the exemplary method 500 (e.g., a power supply circuit or power control circuit). When a response message (e.g., as sent by a powered device executing step 580) arrives, execution flow of the method 500 may proceed to step 525.

The exemplary method 500 may, at step 525, comprise receiving (e.g., at a power supply circuit or power control module implementing the method 500) the arriving response message that corresponds to the request (or poll) message transmitted at step 515. Step 525 may, for example and without limitation, share various characteristics with the functionality discussed previously with regard to the power control data bus interface 112 illustrated in FIG. 1 and discussed previously.

The method 500 may then, at step 530, comprise processing the received response. As discussed previously, the response message may comprise power control data. Step 530 may comprise processing the received power control data to determine whether to adjust one or more characteristics of electrical power being output from a device implementing the exemplary method 500. As mentioned previously in the discussion of FIG. 1, step 530 may comprise processing power control data received from a plurality of sources. Also as mentioned previously, the power supply characteristics may comprise any of a variety of characteristics of electrical power.

The exemplary method 500 may, at step 535, comprise adjusting one or more characteristics of electrical power that is being provided (e.g., by a first circuit implementing the exemplary method 500 to a second circuit implementing the exemplary method 550). Step 535 may comprise making such adjustments based, at least in part, on power control data received with the response message at step 525.

Following step 535, execution of the exemplary method 500 may flow back up to step 510, for communication of power control data with another device. In an alternative exemplary scenario involving waiting for a plurality of response messages, execution of the method 500 may flow back up to step 520 for awaiting the arrival of additional response messages. Execution of the exemplary method 500 may traverse many alternative flow paths. Accordingly, the scope of various aspects of the present invention should not be limited by the exemplary flow illustrated in FIG. 5*a*.

The exemplary methods 500, 550 illustrated in FIGS. 5*a*-5*b* were generally provided to illustrate an exemplary scenario involving the synchronous communication of power control data over a power control data bus and the utilization of such data. For an exemplary scenario involving asynchronous communication of power control data over a power control data bus and the utilization of such data, refer to FIGS. 6*a* and 6*b*.

Figure 6A:
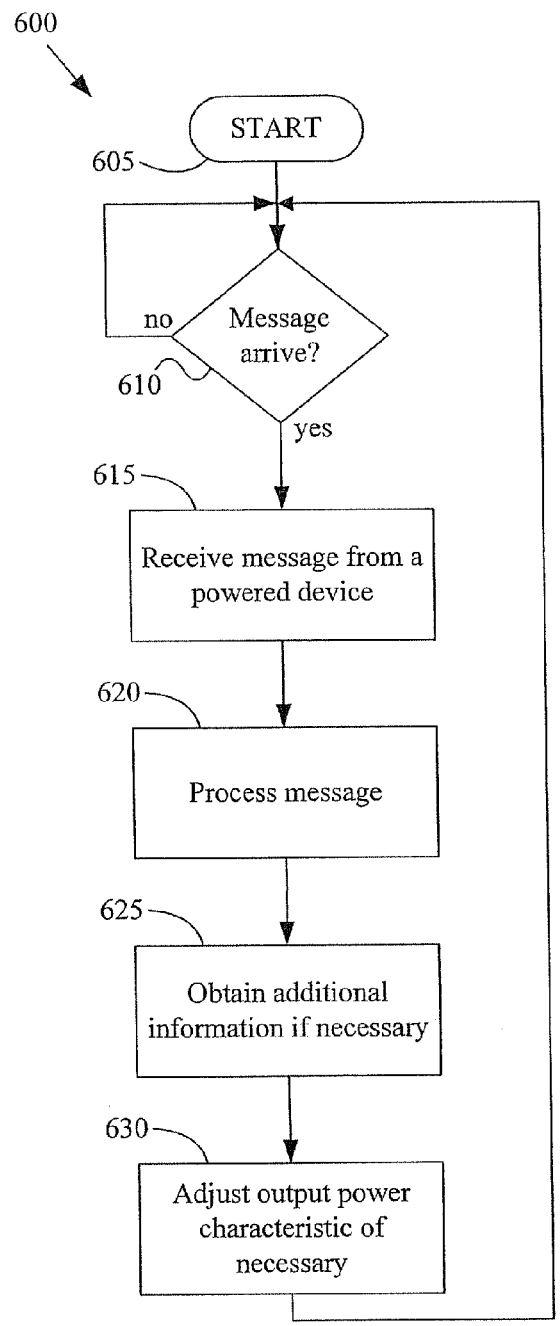
FIG. 6a illustrates flow of an exemplary asynchronous method for utilizing information communicated over a power control data bus to control power, in accordance with various aspects of the present invention.
Figure 6B:
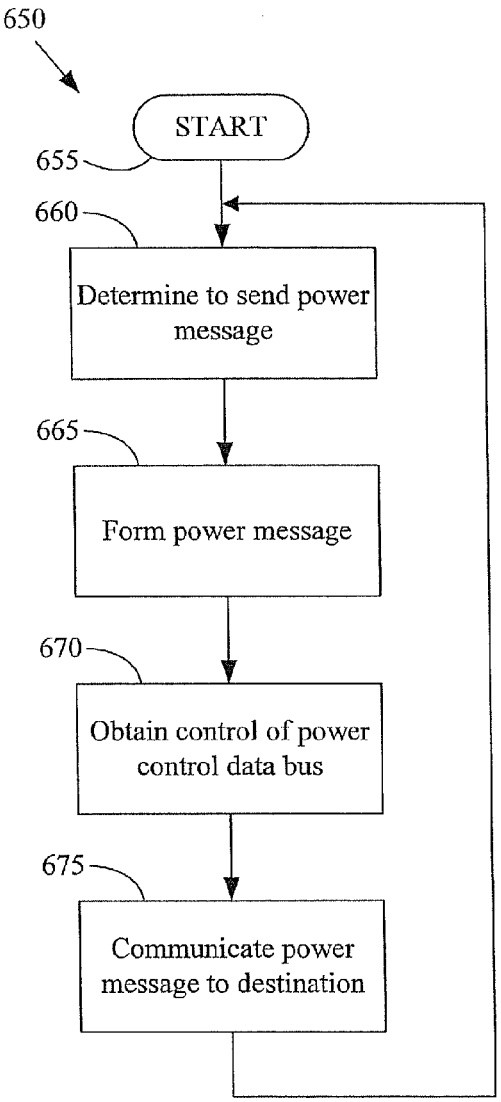
FIG. 6b illustrates flow of an exemplary asynchronous method for communicating power control information over a power control data bus, in accordance with various aspects of the present invention.

FIG. 6*a* illustrates flow of an exemplary asynchronous method 600 for utilizing information communicated over a power control data bus to control power, in accordance with various aspects of the present invention. FIG. 6*b* illustrates flow of an exemplary asynchronous method 650 for communicating power control information over a power control data bus, in accordance with various aspects of the present invention.

The exemplary method 600 illustrated FIG. 6*a* may, for example, be implemented in a power-supplying (or power controlling) circuit, and the exemplary method 650 illustrated in FIG. 6*b* may, for example, be implemented in a power-receiving integrated circuit. Accordingly, the exemplary methods 600, 650 will be presented in a manner illustrative of the processing and interaction between an exemplary power-supplying circuit and an exemplary power-receiving integrated circuit implementing the respective methods 600, 650. However, the scope of various aspects of the present invention should by no means be limited to requiring aspects of both exemplary methods 600, 650.

The exemplary method 600 may, for example and without limitation, share various characteristics with the functionality discussed previously with regard to the exemplary power supply circuits 110, 210, 310 or power control module 410 illustrated in FIGS. 1-4 and with the exemplary method 500 illustrated in FIG. 5*a*. The exemplary method 650 may, for example and without limitation, share various characteristics with the functionality discussed previously with regard to the exemplary integrated circuits 120-150, 220-250, 320-250 or functional modules 420-450 illustrated in FIGS. 1-4 and with the exemplary method 550 illustrated in FIG. 5*b*.

The exemplary method 650 may, at step 660, comprise determining to transmit a message including power control data (e.g., to power supply or power control circuitry). Such a determination may be made for any of a variety of reasons. For example and without limitation, as with the exemplary method 550, such a determination may be made in response to receiving a request for power control data. Also for example, step 660 may comprise making such a determination asynchronously. For example step 660 may comprise making such a determination in response to a timer expiring or in response to real-time operating conditions of a device implementing the method 650. Also for example, step 660 may comprise making such a determination in response to a command received from a user or other device to update characteristics of received power. Further for example, step 660 may comprise making such a determination in response to a desire to enter a different operating state that has different power supply requirements. Accordingly, the scope of various aspects of the present invention should not be limited by characteristics of any particular cause or condition for determining to send power control data.

The exemplary method 650 may, at step 665, comprise forming a message that includes power control data. Step 665 may, for example, comprise determining which power control data to send in order to achieve a desired power supply adjustment. Step 665 may, for example, comprise obtaining power control data (e.g., as obtained at step 570 of the exemplary method 500). Such obtaining may, for example, comprise retrieving power control data from memory, obtaining power control data from sensors, calculating power control data values, etc. Step 665 may also comprise forming the obtained power control data into one or more message units that may be communicated to a receiving entity (e.g., power supply or power control circuitry). As discussed previously, the power control data and/or messaging data may comprise any of a large variety of characteristics. Accordingly, the scope of various aspects of the present invention should not be limited by characteristics of particular power control data or messaging data.

The exemplary method 650 may, at step 670, comprise obtaining control of the power control data bus. As mentioned previously, in various exemplary scenarios, a power control data bus may be governed by various communication protocols, including contention-based and contention-free protocols. In the exemplary scenario illustrated in FIG. 6b, step 670 may comprise obtaining control of the power control data bus using a contention-based data communication protocol (e.g., CSMA, CSMA/CD, ALOHA, etc.).

After obtaining control of the power control data bus at step 670, the method 650 may, at step 675, comprise communicating the message, including the power control data, to the destination device (e.g., a power supply or control circuit implementing the exemplary method 600). As discussed previously, such communication over the power control data bus may be accomplished in any of a variety of manners, and the scope of various aspects of the present invention should not be limited by any particular manner of communicating power control data over the power control data bus. After executing step 675, execution of the exemplary method 650 may flow back to step 660 to wait for a next determination to send a power control data message.

The exemplary method 600 may, at step 610, comprise waiting for a message including power control data to arrive over a power control data bus (e.g., from a powered device implementing the exemplary method 650 illustrated in FIG. 6b at step 675). Upon receipt of a power control data message, execution of the exemplary method 600 may flow to step 615. Step 615 may, for example and without limitation share various characteristics with step 525 of the exemplary method 500 illustrated in FIG. 5a.

After receiving a power control data message (e.g., at step 615), the method 600 may, at step 620, comprise processing at least a portion of the power control data of the received message. Step 620 may, for example and without limitation, share various characteristics with step 530 of the exemplary method 500 illustrated in FIG. 5. Such processing may, for example and without limitation, comprise processing the power control data to determine if an adjustment to power supply output characteristics is desirable. Such processing may, for example, comprise processing at least a portion of power control data received from one or more source devices (e.g., integrated circuits or modules thereof).

In various exemplary scenarios, step 620 may desire additional information to perform its processing. In such an exemplary scenario, the method 600 may, at step 625, comprise obtaining such additional information. Step 625 may, for example, comprise sending a request for additional information to the sender of the message received at step 615 or to some other device. For example and without limitation, step 625 may share various characteristics with the exemplary steps 510-530 of the exemplary method 500 illustrated in FIG. 5a.

The exemplary method 600 may, at step 630, comprise adjusting one or more characteristics of output electrical power (e.g., output from a power supply or control circuit implementing the method 500). Step 630 may, for example and without limitation, share various aspects of step 535 of the exemplary method 500 illustrated in FIG. 5a. After step 630, execution of the exemplary method 600 may flow back up to step 610 to await the arrival of another power control data message.

It should be noted that the previously presented circuits and methods are merely exemplary and were presented to provide specific illustrations of a portion of generally broader aspects of the present invention. Accordingly, the scope of various aspects of the present invention should not be limited by specific characteristics of the prior illustrations.

It should be stressed that various aspects of the present invention may be performed by hardware, a processor executing software instructions, or a combination thereof. Also, various aspects of the present invention may be implemented by devices in various degrees of integration (e.g., modules of an integrated circuit, integrated circuits on an electrical circuit board, or a distributed network of circuit components). Accordingly, the scope of various aspects of the present invention should not be limited by characteristics of any particular implementation.

In summary, various aspects of the present invention provide a system and method for utilizing a power control data bus for power control of an electrical circuit. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A power control circuit for implementing power control in an electrical circuit, the electrical circuit having a power supply circuit that comprises a power control data bus interface and operates to output electrical power, the electrical circuit having an integrated circuit that comprises a power control data bus interface and operates to receive electrical power from the power supply circuit, the power control circuit comprising:

a power control data bus for communicatively coupling the power control data bus interface of the power supply circuit and the power control data bus interface of the integrated circuit, where the power control data bus operates to carry power control data between the integrated circuit and the power supply circuit, said power control data comprising data indicating power supply voltage variability by indicating a level of noise.

2. The power control circuit of claim 1, where said data indicating power supply voltage variability further comprises data indicating power supply voltage tolerance range.

3. The power control circuit of claim 1, where said data indicating power supply voltage variability further comprises data indicating a level of ripple.

4. The power control circuit of claim 1, where said power control data further comprises data indicating power supply voltage level.

5. The power control circuit of claim 1, where said power control data further comprises data requesting a change in voltage level.

6. The power control circuit of claim 1, where said power control data bus operates to communicate a request for power control data from the power supply circuit to the integrated circuit.

7. The power control circuit of claim 1, where said power control data bus operates to communicate unsolicited power control data from the integrated circuit to the power supply circuit.

8. The power control circuit of claim 1, where at least a portion of the power control data corresponds to an unsolicited message from the integrated circuit to the power supply circuit, the unsolicited message requesting a change in power supplied to the integrated circuit and sent to the power supply circuit in response to a change in operational state of the integrated circuit.

9. The power control circuit of claim 1, the electrical circuit having a second integrated circuit that operates to receive electrical power from the power supply circuit over a common power supply bus shared with said integrated circuit and comprises a power control data bus interface, where the power control data bus operates to:
    communicatively couple the power control data bus interface of the power supply circuit and the power control data bus interface of the second integrated circuit; and
    carry second power control data between the second integrated circuit and the power supply circuit,
    where said power control data and said second power control data are adapted to be processed by the power supply circuit to determine at least one characteristic of electrical power provided from the power supply circuit to the integrated circuit and the second integrated circuit over the common power supply bus.

10. The power control circuit of claim 9, where said power control data and said second power control data are adapted to be processed by the power supply circuit to determine at least one characteristic of electrical power being provided from the power supply circuit to the integrated circuit and the second integrated circuit by, at least in part, arbitrating between power supply needs of the integrated circuit and the second integrated circuit.

11. An internal power control circuit for implementing internal power control in an integrated circuit, the integrated circuit having a power control module that comprises a power control data bus interface and operates to control electrical power being provided to one or more functional modules within the integrated circuit, the integrated circuit having a functional module that comprises a power control data bus interface and operates to receive electrical power from the power controller module and, the internal power control circuit comprising:
    a power control data bus, for communicatively coupling the power control data bus interface of the power controller module and the power control data bus interface of the functional module, where the power control data bus operates to carry power control data between the functional module and the power controller module, where said power control data comprises data indicating power supply voltage variability by indicating a level of noise.

12. The internal power control circuit of claim 11, where said data indicating power supply voltage variability further comprises data indicating power supply voltage tolerance range.

13. The internal power control circuit of claim 11, where said data indicating power supply voltage variability further comprises data indicating a level of ripple.

14. The internal power control circuit of claim 11, where said power control data further comprises data indicating power supply voltage level.

15. The internal power control circuit of claim 11, where said power control data further comprises data requesting a change in voltage level.

16. In an electrical circuit having a power supply circuit and a powered integrated circuit, a method for controlling electrical power being provided from the power supply circuit to the powered integrated circuit, the method comprising:
    communicating power control data from the powered integrated circuit to the power supply circuit over a power control data bus, wherein:
    said power control data is adapted to, at least in part, control at least one characteristic of electrical power being provided from the power supply circuit to the power integrated circuit, and
    said power control data comprises data indicating power supply voltage variability by indicating a level of noise.

17. The method of claim 16, where said data indicating power supply voltage variability further comprises data indicating power supply voltage tolerance range.

18. The method of claim 16, where said data indicating power supply voltage variability further comprises data indicating a level of ripple.

19. The method of claim 16, where said power control data further comprises data indicating power supply voltage level.

20. The method of claim 16, where said power control data further comprises data requesting a change in voltage level.

21. The method of claim 16, further comprising communicating a request from the power supply circuit to the integrated circuit over the power control data bus for power control data.

22. The method of claim 16, further comprising communicating unsolicited power control data from the integrated circuit to the power supply circuit over the power control data bus.

23. The method of claim 16, where at least a portion of the power control data corresponds to an unsolicited message from the integrated circuit to the power supply circuit, the unsolicited message requesting a change in power supplied to the integrated circuit and sent to the power supply circuit in response to a change in operational state of the integrated circuit.

24. The method of claim 16, the electrical circuit having a second powered integrated circuit that operates to receive electrical power from the power supply circuit over a common power supply bus shared with said powered integrated circuit, the method comprising:
    communicating second power control data from the second powered integrated circuit to the power supply circuit over the power control data bus, wherein:
    said power control data and said second power control data are adapted to, at least in part, control at least one characteristic of electrical power being provided from the power supply circuit to the powered integrated circuit and the second powered integrated circuit over the common power supply bus.

25. The method of claim 24, where said power control data and said second power control data are adapted to be processed by the power supply circuit to determine at least one characteristic of electrical power being provided from the power supply circuit to the powered integrated circuit and the second powered integrated circuit by, at least in part, arbitrating between power supply needs of the powered integrated circuit and the second powered integrated circuit.

26. In an integrated circuit having a power control module and a functional module, a method for implementing power control, the method comprising:
- communicating power control data from the functional module to the power control module over a power control data bus, wherein:
- the power control data is adapted to, at least in part, control at least one characteristic of electrical power being provided from the power control module to the functional module, and
- the power control data comprises data indicating power supply voltage variability by indicating a level of noise.

27. The method of claim 26, where said data indicating power supply voltage variability further comprises data indicating power supply voltage tolerance range.

28. The method of claim 26, where said data indicating power supply voltage variability further comprises data indicating a level of ripple.

29. The method of claim 26, where said power control data further comprises data indicating power supply voltage level.

30. The method of claim 26, where said power control data further comprises data requesting a change in voltage level.

* * * * *